United States Patent
Chen et al.

(10) Patent No.: US 11,948,033 B2
(45) Date of Patent: Apr. 2, 2024

(54) INTEGRATED BIOMETRIC SENSOR AND MEMORY FOR BIOMETRIC CARD

(71) Applicant: VISA INTERNATIONAL SERVICE ASSOCIATION, San Francisco, CA (US)

(72) Inventors: Yuexi Chen, Foster City, CA (US); Thomas Rapkoch, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/044,548

(22) PCT Filed: Aug. 24, 2021

(86) PCT No.: PCT/US2021/047398
§ 371 (c)(1),
(2) Date: Mar. 8, 2023

(87) PCT Pub. No.: WO2022/086624
PCT Pub. Date: Apr. 28, 2022

(65) Prior Publication Data
US 2023/0267296 A1 Aug. 24, 2023

Related U.S. Application Data

(60) Provisional application No. 63/105,171, filed on Oct. 23, 2020.

(51) Int. Cl.
*G06K 19/073* (2006.01)
*G06K 19/077* (2006.01)

(52) U.S. Cl.
CPC . *G06K 19/07354* (2013.01); *G06K 19/07745* (2013.01); *G06K 19/07749* (2013.01)

(58) Field of Classification Search
CPC ................................................ G06K 19/07354
See application file for complete search history.

(56) References Cited

U.S. PATENT DOCUMENTS

| 10,769,405 | B2* | 9/2020 | Pompeani | G06K 19/07747 |
| 11,126,995 | B2* | 9/2021 | Gandolfo | G06Q 20/341 |
| 2005/0139685 | A1 | 6/2005 | Kozlay | |

(Continued)

FOREIGN PATENT DOCUMENTS

| FR | 2732796 A1 * | 10/1996 | G06K 19/07745 |
| KR | 20180041014 A | 4/2018 | |
| WO | 2017162311 A1 | 9/2017 | |

OTHER PUBLICATIONS

Application No. PCT/US2021/047398, International Preliminary Report on Patentability, dated May 4, 2023, 5 pages.

(Continued)

*Primary Examiner* — Seung H Lee
(74) *Attorney, Agent, or Firm* — Kilpatrick Townsend & Stockton LLP (57) ABSTRACT

Embodiments of the invention are directed to a user device. A fingerprint sensor can be located adjacent to electrical contacts. As a result, both the fingerprint sensor and the electrical contacts can be directly connected to an underlying memory within the user device. The direct connection allows the user device to be free of wires.

20 Claims, 8 Drawing Sheets

(56) References Cited

U.S. PATENT DOCUMENTS

| | | |
|---|---|---|
| 2018/0174018 A1 | 6/2018 | Lundberg et al. |
| 2019/0340398 A1 | 11/2019 | Mosteller |
| 2020/0226443 A1 | 7/2020 | Lotya et al. |

OTHER PUBLICATIONS

Application No. PCT/US2021/047398, International Search Report and Written Opinion, dated Nov. 30, 2021, 8 pages.

* cited by examiner

INTEGRATED BIOMETRIC SENSOR AND MEMORY FOR BIOMETRIC CARD

CROSS-REFERENCES TO RELATED APPLICATIONS

This application is a 371 application of international application number PCT/2021/047398, filed on Aug. 24, 2021, and claims the benefit of the filing date of U.S. Provisional Application No. 63/105,171, filed on Oct. 23, 2020, which is herein incorporated by reference in its entirety for all purposes.

BACKGROUND

User devices in the form of cards can include a number of electrical components. While modern user devices have many functionalities, the various complex components make the user devices expensive and difficult to produce, and often cause high failure rates. For example, including various electrical components on the user device often requires using wires to connect the electrical components so that they can communicate. Such wires are prone to failure and complicate manufacturing processes.

Embodiments of the present invention address these problems and other problems, individually and collectively.

SUMMARY

Embodiments of the present invention are directed to a user device with components that are positioned adjacent to each other. For example, a fingerprint sensor can be positioned adjacent to a memory and/or electrical contacts. Adjacent positioning of the components allows the components to be electrically connected without the use of extra wires. Reducing the number of wires in a user device improves the reliability of the user device, reduces the complexity of the user device, and reduces cost of manufacturing the user device.

One embodiment of the invention is directed to a user device comprising a substrate. There is a first cavity in the substrate and a second cavity in the substrate, the second cavity being adjacent to the first cavity in the substrate. The user device also comprises a memory within the second cavity, electrical contacts within the first cavity, where the electrical contacts at least partially overlap the memory, and a fingerprint sensor within the first cavity, where the fingerprint sensor at least partially overlaps the memory. The user device further includes a first electrical connection between the memory and the electrical contacts, the first electrical connection enabling communication between the memory and the electrical contacts, as well as a second electrical connection between the memory and the fingerprint sensor, the second electrical connection enabling communication between the memory and the fingerprint sensor.

One embodiment of the invention is directed to a method of manufacture comprising creating a substrate, creating a first cavity within the substrate, and creating a second cavity within the substrate, the second cavity being adjacent to the first cavity. The method further includes inserting a memory into the second cavity, inserting a fingerprint sensor into the first cavity, the fingerprint sensor at least partially overlapping the memory, where the fingerprint sensor is electrically coupled to at least one first electrical connector connecting the fingerprint sensor to the memory, and providing electrical contacts in the first cavity, the electrical contacts at least partially overlapping the memory, where one or more of the electrical contacts are electrically coupled to at least one second electrical connector connecting the electrical contacts to the memory.

Further details regarding embodiments of the invention can be found in the Detailed Description and the Figures.

DETAILED DESCRIPTION

Embodiments of the present invention are directed to a user device with components that are positioned adjacent to each other. For example, a fingerprint sensor can be positioned adjacent to a memory and/or electrical contacts in the user device. Positioning the components in a user device adjacent to each other allows the components to be electrically connected to each other without the use of extra wires. Reducing the number wires or eliminating them improves the reliability of the user device, reduces the complexity of the user device, and reduces the cost of manufacturing.

A "user device" may be a tool used by a user to gain access, such as access to information, physical space, public transit, goods, services, etc. A user device may include evidence that the user is permitted to gain access. A user device can be configured to provide some information about the user and/or the user's access permissions. In some embodiments, the user device can communicate electronically with an access control terminal in order to prove that the user is permitted to gain access. User devices can be in the form of cards, and specific examples of user devices can include access badges, transit fare cards, payment cards such as credit, debit, and prepaid card, loyalty cards, IDs such as drivers licenses, etc.

In some embodiments, a user device may comprise a substrate such as a paper or plastic card. Information may be printed, embossed, encoded, or otherwise included at or near a surface of the substrate. The user device may include circuitry with, for example, permanent voltage values for storing information. Suitable user devices can be hand-held and compact so that they can fit into a user's wallet and/or pocket (e.g., pocket-sized). The user device may be able to operate in a contact mode and/or a contactless mode. As an example, a user device can include a smart card. In some embodiments, a smart card can serve as a security card, a payment card, an access card, or any other suitable type of card.

Figure 1:
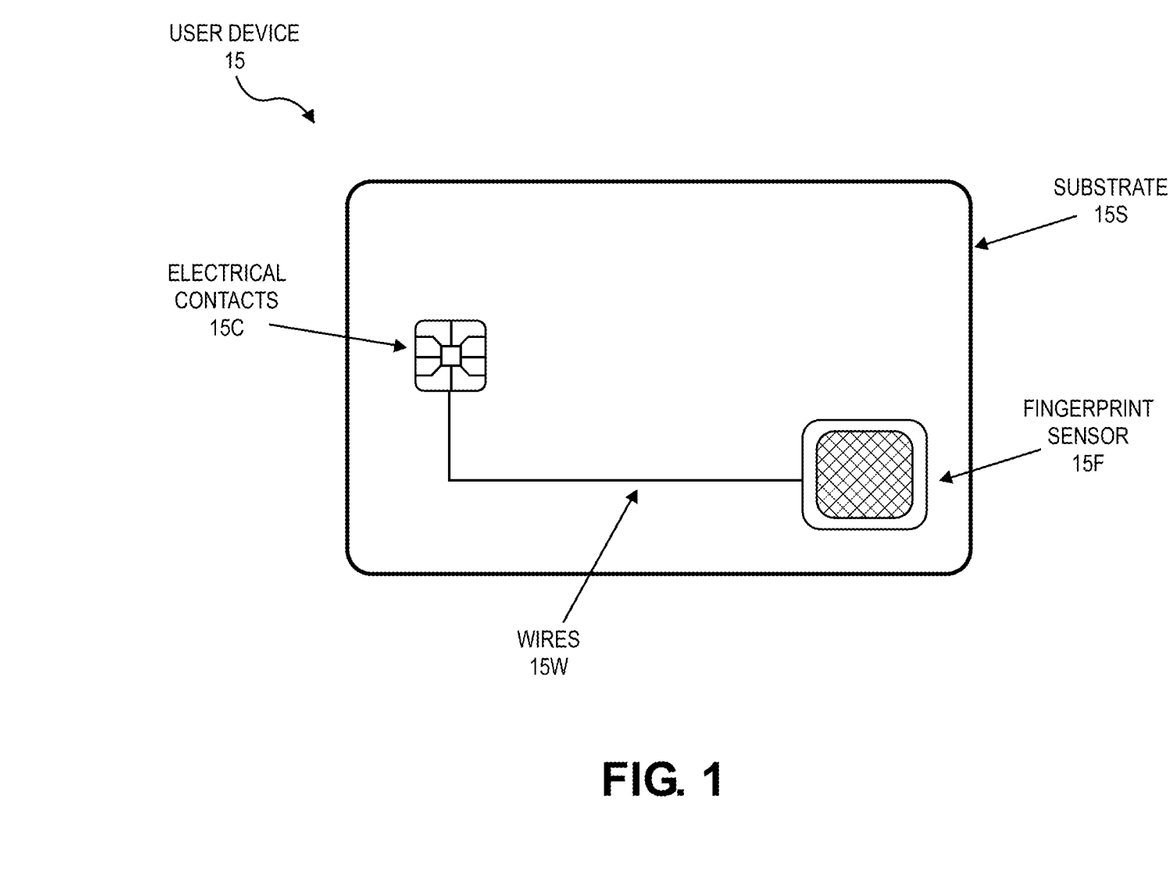
FIG. 1 shows a diagram of a front surface of a convention user device with a typical configuration of components.

FIG. 1 shows a diagram of a front surface of a conventional user device 15. The user device 15 can take the form of a card comprising a substrate 15S. The user device 15 can further include a fingerprint sensor 15F, a plate of electrical contacts 15C, and wires 15W, each of which may be embedded within or on the substrate 15S.

As shown in FIG. 1, the fingerprint sensor 15F is located on the opposite side of the user device 15 relative to the electrical contacts 15C. Specifically, the electrical contacts 15C are located near the left side of the front surface of the user device 15, while the fingerprint sensor 15F is shown near the bottom right corner of the front surface of the user device 15.

The fingerprint sensor 15F may interact with a memory during a biometric authentication process. In some embodiments, a memory (not shown) may be located within the substrate 15S and underneath the electrical contacts 15C, on the opposite side of the user device 15 relative to the fingerprint sensor 15F. Accordingly, in order to provide power and a communication pathway between the fingerprint sensor 15F and the memory, the wires 15W are included.

The wires 15W provide electrical connections for communications between the fingerprint sensor 15F and the memory in the substrate 15S proximate the electrical contacts 15C, and for providing power to the fingerprint sensor 15F. A first wire provides power and a second wire provides communication signals. Additional wires, such as a clock wire, may also be included. The wires 15W may comprise metal. The wires 15W may extend laterally across body of the user device from the fingerprint sensor 15F to the memory.

When the user device 15 is initially created, a first set of electrical and mechanical attachments may be created between the first ends of the wires 15W and the fingerprint sensor 15F, and a second set of electrical and mechanical attachments may be created between a second ends of the wires 15W and the memory.

The wires 15W typically do not connect the fingerprint sensor 15F directly to the electrical contacts 15C. While the depiction of the wires 15W shown in FIG. 1 show the wires 15W in electrical contact with the electrical contacts 15C, the wires 15W can lead to the memory (not shown in FIG. 1) in the user device 15 underneath the electrical contacts 15C.

The configuration of the components in the user device 15 in FIG. 1 has disadvantages. For example, it is difficult to manufacture user devices with wires, such as the wires 15W. As explained above, two steps are performed for each of the wires 15W, to connect each end of the wire to components at opposite ends of the wire (e.g., the fingerprint sensor 15F and the memory). For example, two separate solder connections (e.g., via ultrasound soldering) must be made to connect the ends of the first wire to respective components, and two more solder connections are made to connect the ends of the second wire to respective components. The wires 15W and the connected ends (e.g., soldered connections) need to be produced in such a way that they are strong, resilient, and have high endurance (e.g., against physical effects such as bend, against weather such as humidity, etc.). As a result, the production cost of this type of user device 15 is high, the yield rate is high, and the connection failure rate is high.

The wires 15W can also have parasitic effects on the electrical circuitry of the user device 15. Conductive wires can introduce unwanted resistance and inductive capacitance, which can cause delays in signal transmission, increased power demands, and increased signal noise.

Embodiments of the invention address these and other problems, individually and collectively.

Figure 2:
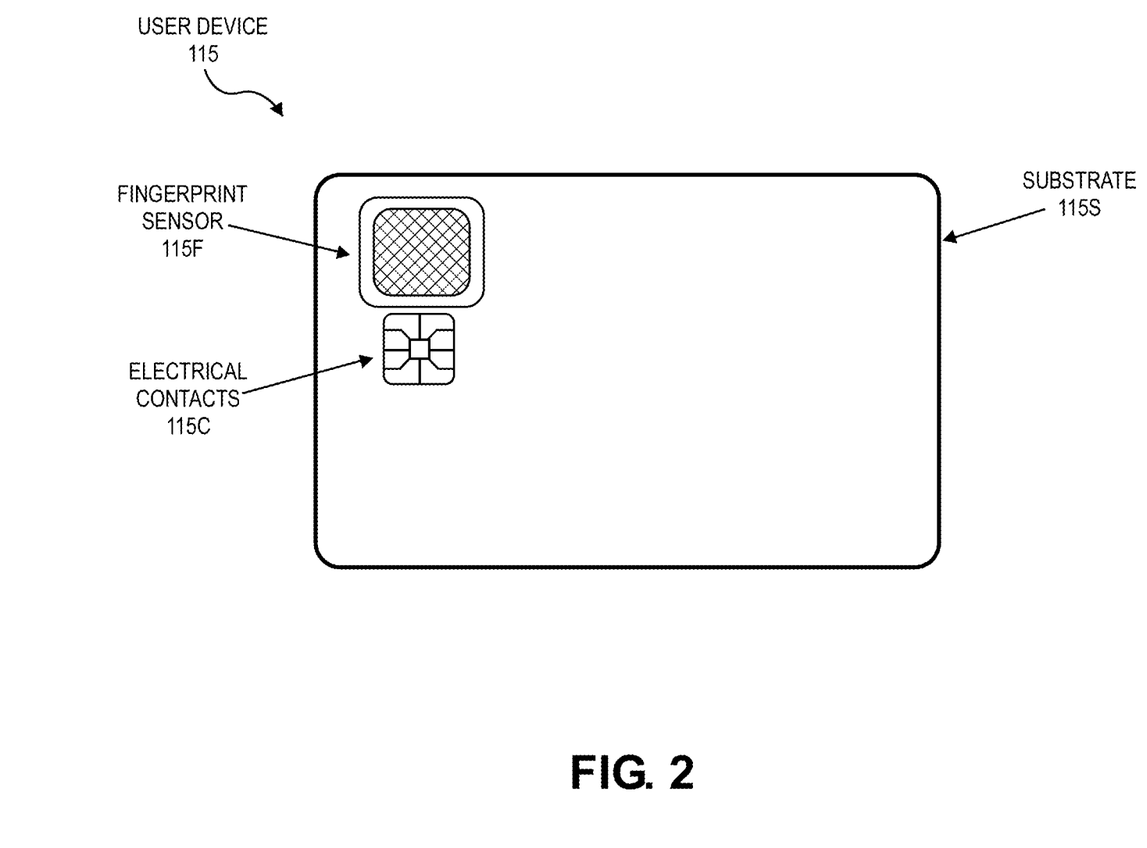
FIG. 2 shows a diagram of a front surface of a user device, according to embodiments of the invention.

FIG. 2 shows a diagram of a front surface of a user device 115 according to an embodiment of the invention. The user device 115 shown in FIG. 2 is in the form of a card, and includes a substrate 115S, a fingerprint sensor 115F, electrical contacts 115C. The user device 115 can also include a memory and/or a contactless element that are not shown in FIG. 2, but are embedded in the substrate 115S. The substrate 115S can include one or more layers of material. The one or more layers may comprise plastic, metal, or other suitable material.

As shown in FIG. 2, when viewed from a top plan view, the fingerprint sensor 115F is located adjacent to the electrical contacts 115C. In this example, the fingerprint sensor 115F is located above the electrical contacts 115C and near the top-left corner of the user device 115. Due to this position, the fingerprint sensor 115F can overlap with an underlying memory within the substrate 115S, which thereby allows the fingerprint sensor 115F to be directly connected (e.g., via soldering) to the memory without the use of wires.

In some embodiments, the fingerprint sensor 115F may directly abut the electrical contacts 115C so that the two components are flush. In other embodiments, the fingerprint sensor 115F is slightly spaced from the electrical contacts 115C, and may be separated by an insulator such as plastic. For example, the distance separating the fingerprint sensor 115F and electrical contacts 115C can be from 0-5 mm in some embodiments. The space between the electrical contacts 115C and the fingerprint sensor 115F may be less than the width of the memory (e.g., 20 mm), so that both the fingerprint sensor 115F and the electrical contacts 115C can overlap the underlying memory with the substrate 115S.

As shown in FIG. 2, the wires 15W illustrated in FIG. 1 are not needed. When the wires are removed, the manufacturing process for the user device 115 is simplified and is more efficient. Further, using embodiments of the invention, the number of parts needed to create the user device 115 is reduced relative to the user device 15 in FIG. 1. As a result, the failure rate of the user device 115 is reduced compared with the design shown in FIG. 1. For example, instead of performing two soldering steps for each wire (e.g., to connect the fingerprint sensor 15F to one end of the wire and the memory to the other end of the wire), embodiments of the invention can perform one soldering step for each connection (e.g., signal connection, power connection) between the fingerprint sensor 115F to an underlying memory. Further, because the wires 15W are not present in the embodiment in FIG. 2, the electrical problems associated with wires is not present in the embodiment in FIG. 2.

Figure 3:
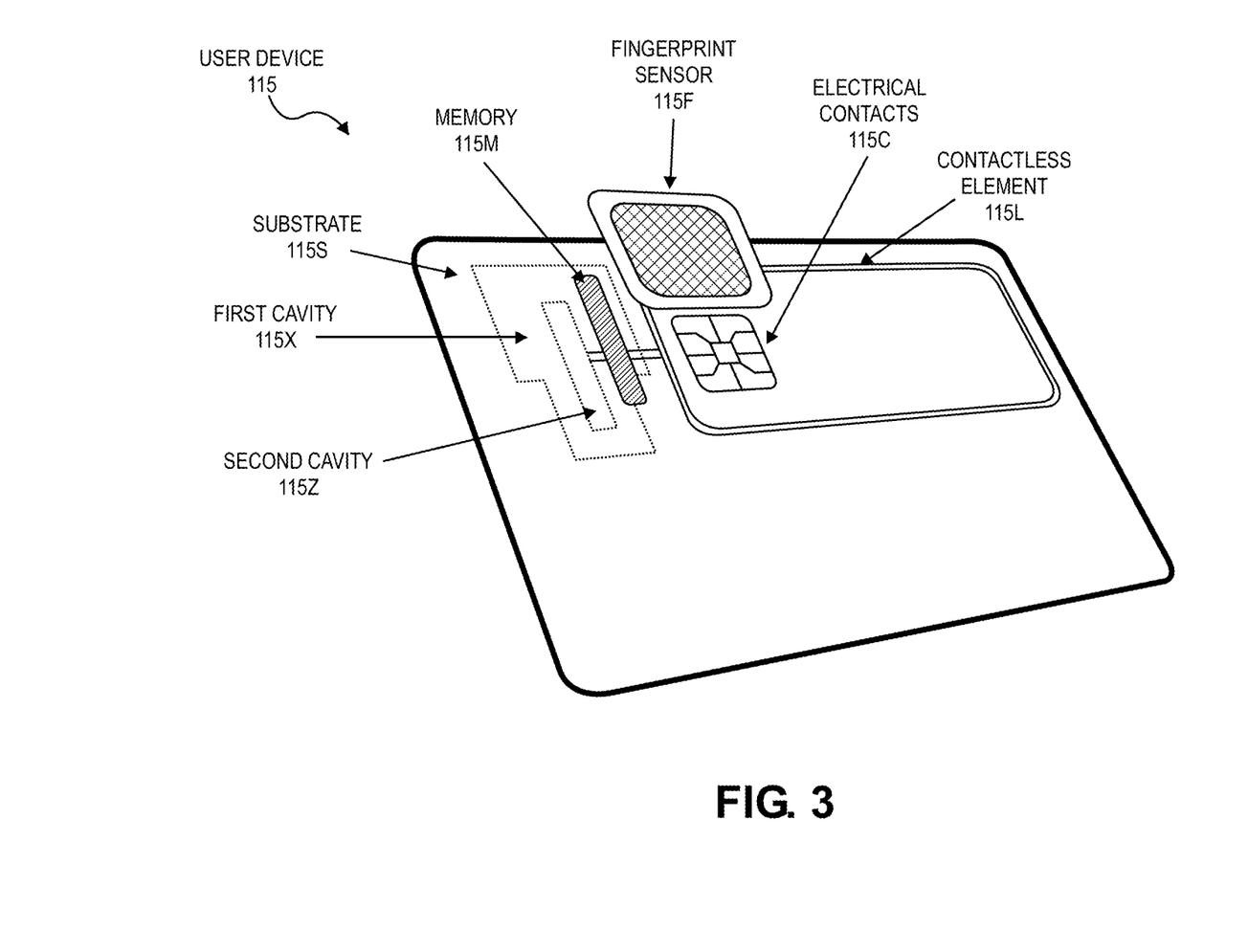
FIG. 3 shows an exploded-view illustration of a user device, according to embodiments of the invention.

The configuration of components shown in FIG. 2 can be further described and understood by the depiction in FIG. 3. FIG. 3 shows the same user device as FIG. 2, but as an exploded-view illustration, according to some embodiments.

In the illustration of FIG. 3, the fingerprint sensor 115F and electrical contacts 115C are shown. A memory 115M is embedded in the user device 115, and is shown as being under the fingerprint sensor 115F and electrical contacts 115C.

There are at least two cavities within the user device 115. A first cavity 115X is a cavity in the substrate 115S of the user device 115. The first cavity 115X has a shape (e.g., height, width, and depth) and a configuration that can accommodate the fingerprint sensor 115F and the electrical contacts 115C. The fingerprint sensor 115F and electrical contacts 115C may lie in the same plane, and together may be cooperatively structured with respect to the lateral walls defining the first cavity 115X. As shown, when the fingerprint sensor 115F and the electrical contacts 115C are placed in the first cavity 115X, they are positioned adjacent to one another within the same plane. In this example, the first cavity 115X has six lateral walls, and a bottom plane. Part of the bottom plane is defined by a bottom wall and part is defined by an upper plane forming an opening of the second cavity 115Z.

The second cavity 115Z is another cavity in the substrate 115S of the user device 115. The second cavity 115Z is adjacent to the first cavity 115X. For example, as shown in FIG. 3, second cavity 115Z is underneath the first cavity 115X, and the second cavity 115Z extends deeper into the substrate 115S than the shallower first cavity 115X. The second cavity 115Z has a shape (e.g., height, width, and depth) and configuration to accommodate the memory 115M. In this example, the lateral shape of the second cavity 115Z is shown as being in the form of a rectangle, and the lateral dimensions of the second cavity 115Z are smaller than the lateral dimensions of the first cavity 115X. The memory 115M may fit within the second cavity 115Z so that it is close to or in contact with the side walls defining the second cavity 115Z. In some embodiments, the walls including the side walls and bottom wall defining the second cavity can be cooperatively structured with the memory 115M. When the memory 115M is placed in the second cavity 115Z, it becomes positioned in a second plane that is underneath the plane of the fingerprint sensor 115F and the electrical contacts 115C. The second cavity 115Z in FIG. 2 defined by four internal walls in the substrate 115S, and a bottom internal wall in the substrate 115S. A plane defining an opening of the second cavity 115Z can coincide with a bottom wall of the first cavity 115X.

When the user device 115 is assembled, the memory 115M is located in the second cavity 115Z, and the fingerprint sensor 115F and electrical contacts 115C are located in the first cavity 115X. Due to the relative shapes and locations of the first cavity 115X and the second cavity 115Z, the memory 115M can be positioned so that it is at least partially underneath both of the fingerprint sensor 115F and the electrical contacts 115C. This at least partial-overlapping arrangement allows the memory 115M to be in more direct electrical and mechanical contact with both of the fingerprint sensor 115F and the electrical contacts 115C as compared to the user device 15 illustrated in FIG. 1. Electrical connections such as solder connections (e.g., solder balls) can be made between the memory 115M and the fingerprint sensor 115F, as well as the memory 115M and the electrical contacts 115C.

In some embodiments, the memory 115M, and at least one of the fingerprint sensor 115F, and/or the electrical contacts 115C can be soldered or packaged together (or otherwise manufactured together as one component) before being inserted into the user device 115, so that one fully-connected semiconductor chip component is inserted into the user device 115.

According to various embodiments, the locations, shapes, and configuration of the cavities can vary. For example, variations in the design of the memory 115M, the fingerprint sensor 115F, and/or the electrical contacts 115C can result in variations to the layout the user device 115 and/or the shapes of the cavities. As shown in FIG. 3, the first cavity 115X is larger than second cavity 115Z. In other embodiments, the second cavity 115Z may be larger than the first cavity 115X. This may be the case, if, for example, the memory 115M is larger than the fingerprint sensor 115F and electrical contacts 115C.

The memory 115M can include a computer readable medium and/or one or more hardware processors. For example, the memory 115M can include one or more packaged integrated circuit chips and may include suitable volatile and non-volatile memories including DRAMs, EEPROMs, etc. The memory 115M may also comprise a data processor. In some embodiments, the memory 115M is a secure element chip. The memory 115M can store data and computer code as well as execute the computer code to complete a task. For example, the memory 115M can store cryptographic keys, one or more access applications, access credentials, and other suitable data for interacting with an access device to gain access to a desired resource. The memory 115M can also store personal information such as a name, address, email address, phone number, or any other suitable identification information of one or more users. To execute an access transaction, the memory 115M can provide access data (e.g., credentials) to an access device through multiple channels (e.g., in conjunction with the electrical contacts 115C or the contactless element 115L). A credential may include any suitable information that serves as reliable evidence of worth, ownership, identity, or authority, such as a string of numbers, letters, or any other suitable characters.

The electrical contacts 115C may be in the form of electrically conductive lands, pads, or plates with any suitable configuration and shape. The electrical contacts 115C can include conductive materials, such as copper, aluminum, gold, silver, or alloys. In some embodiments, the electrical contacts 115C are configured according to the ISO/IEC 7816 standards. The electrical contacts 115C can be electrically connected to the memory 115M so that the memory 115M can communicate with external devices via the electrical contacts 115C. Through the electrical contacts 115C, the user device 115 can interface and communicate with an access device (e.g., through a physical contact connection between the electrical contacts 115C and a contact chip reader at the access device). The electrical contacts 115C may be printed electrical circuits produced by known circuit printing techniques.

The contactless element 115L, which can be present on or embedded within the substrate 115S, may include any suitable type of wireless transceiver, such as an antenna. In some embodiments, the contactless element 115L conforms to the ISO/IEC 14443 standard. The contactless element 115L can be electrically connected to the memory 115M so that the memory 115M can communicate with external devices via the contactless element 115L. The contactless element 115L enables the user device 115 to communicate with the access device through over-the-air communications (e.g., short range wireless communications) with a contactless reader at the access device. "Short range communication" or "short range wireless communication" may comprise any method of providing short-range contact or contactless communications capability, such as RFID, Bluetooth™, infra-red, or other data transfer capability that can be used to exchange data between a user device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g., to a range of less than 1 meter, less than 10 centimeters, or less than 2.54 centimeters) for security, technical, and/or practical considerations.

The contactless element 115L is shown in FIG. 3 in the form of an antenna. As shown, the contactless element 115L can be electrically connected to the to the memory 115M. Accordingly, all three components (e.g., the contactless element 115L, the fingerprint sensor 115F, and the electrical contacts 115C) can be (e.g., mechanically and electrically) connected to the memory 115M.

The fingerprint sensor 115F can be used to biometrically authenticate the user. The fingerprint sensor 115F can be any suitable sensor, such as the FPC1300-SERIES by Fingerprint Cards™ or the VFS75xx by Synaptics™. The fingerprint sensor 115F can be electrically connected to the memory 115M so that captured biometric data can be provided to the memory 115M for processing. Successful biometric authentication can cause the user device 115 to activate and perform operations for gaining access. For example, in some embodiments, the fingerprint sensor 115F can be used to activate the contactless element 115L for a contactless communications (e.g., in conjunction with the memory 115M). In some embodiments, other types of biometric sensors can be incorporated instead of or in addition to the fingerprint sensor 115F, such sensors for recognizing a person's voice, speech patterns, retina, iris, face, DNA, hand geometry, palm print, gait, certain behaviors, etc.

In some embodiments, the fingerprint sensor 115F can be part of a package that includes a fingerprint microcontroller unit (MCU) that is connected to the fingerprint sensor 115F. The fingerprint MCU can store an enrolled fingerprint template, extract a captured fingerprint template from a fingerprint image captured by the fingerprint sensor 115F, determine whether the captured fingerprint template matches the enrolled fingerprint image, and then notify an application running on the memory 115M) about the match result (e.g., in order to activate the contactless element 115L or the electrical contacts 115C).

In some embodiments, a magnetic stripe (not shown) may also be present on the substrate 115S. The magnetic stripe may enable the user device 115 to provide information to the access device via a magnetic stripe reader at the access device.

In some embodiments, identification information (not shown) may also be printed or embossed on the user device 115. Identification information can include, for example, an account number, expiration date, and/or a user name.

Another advantage of the configuration shown in FIGS. 2-3 is that multiple separate semiconductor chip components can be integrated into a single semiconductor chip component or package. For example, the configuration shown in FIG. 1 involves both the memory as a first semiconductor chip component and a separate fingerprint MCU at the fingerprint sensor 15F as a second semiconductor chip component. In contrast, the configuration shown in FIGS. 2-3 allows the fingerprint MCU to be combined with the memory 115M to create a single combined semiconductor chip component. Producing one semiconductor chip component instead of separately producing and then connecting two provides a further improvement to manufacturing efficiency and simplicity.

In some embodiments, the functionality of the fingerprint microcontroller unit (MCU) can be incorporated into the memory 115M. Accordingly, one combined semiconductor chip component can include the functionality and operability of the memory 115M (e.g., executing contact and contactless access applications) as well as the functionality and operability of the fingerprint MCU (e.g., biometric authentication processing).

In some embodiments, the memory 115M and fingerprint MCU remain as separate chips with separate logic, while still being physically combined into a single die. A die, in the context of integrated circuits, is a small block of semiconducting material on which a given functional circuit is fabricated. If in the form of separate chips with separate logic, the memory 115M and fingerprint MCU can still be communicatively and operatively connected.

In some embodiments, the user device 115 can be configured so that different actions activate different communication modes. For example, a first type of action can be inserting the user device 115 into a contact reader at an access device. This first type of action can cause the electrical contacts 115C and/or a corresponding application to be activated (e.g., by the memory 115M). When the user device 115 is inserted into the contact reader, electrical communication signals from the contact reader may be received by the electrical contacts 115C and transmitted to the memory 115M, which may in turn initiate a contact-based access process. A second type of action can be providing biometric input. This second type of action can cause the contactless element 115L and/or a corresponding application to be activated (e.g., by the memory 115M). For example, a fingerprint applied to the fingerprint sensor 115F may cause the memory 115M to activate the contactless element 115L and/or a corresponding application, and otherwise initiate a contactless-based access process. In this way, embodiments allow different modes of communication to be associated with and activated by different inputs to the user device 115.

Figure 4:
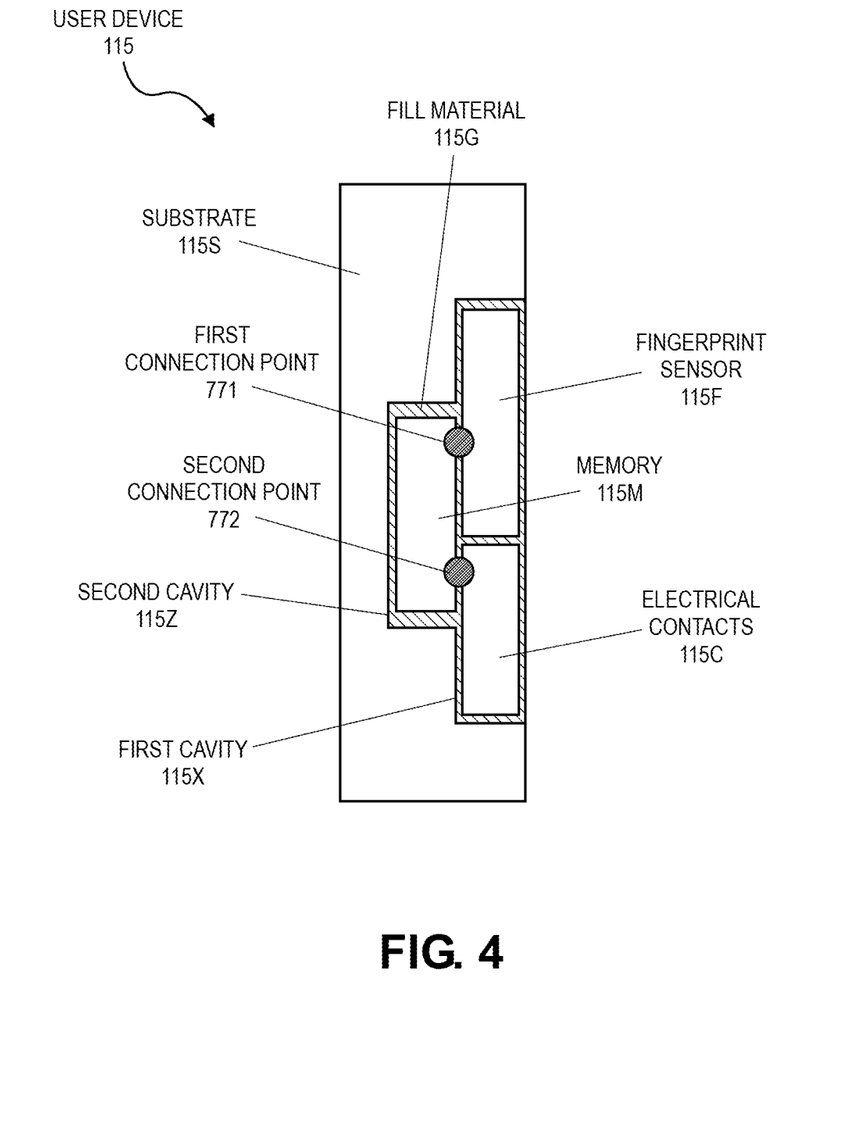
FIG. 4 shows of a cross-sectional view of a user device, according to embodiments of the invention.

FIG. 4 shows a cross sectional view of the user device 115, according to embodiments of the invention. This cross section shows the first cavity 115X and the second cavity 115Z formed in the substrate 115S. The memory 115M can be placed within the first cavity 115X, and the fingerprint sensor 115F and/or the electrical contacts 115C can be placed within the second cavity 115Z. Additionally, two connectors 771 and 772 are shown in between the first cavity 115X and the second cavity 115Z. These connectors can represent solder balls (or solder bumps), or any other suitable means for providing a direct electrical connection between components, and additional connectors may be present in the user device 115 to connect the components.

For example, the first connector 771 can represent a soldered connection between the memory 115M and the fingerprint sensor 115F, and the second connector 772 can represent a soldered connection between the memory 115M and the electrical contacts 115C. While a single soldered connection is shown for fingerprint sensor 115F, and another single soldered connection is shown for electrical contacts 115C, there may be more than one soldered connection for each component, in some embodiments. For example, the first connector 771 can represent a soldered connection for providing electrical signal communications between the memory 115M and the fingerprint sensor 115F, and another soldered connection (not shown) can be included to provide power to the fingerprint sensor 115F. Similarly, the second connector 772 can represent a soldered connection for providing electrical signal communications between the memory 115M and the electrical contacts 115C, and another soldered connection (not shown) can be included to provide power to the electrical contacts 115C.

Accordingly, as shown by the connectors 771 and 772, each of the fingerprint sensor 115F and the electrical contacts 115C can be connected to the memory 115M without wires. As a result, the fingerprint sensor 115F can be connected to the memory 115M through non-wire connectors (e.g., solder balls). This is in contrast to the user device 15 shown in FIG. 1, where the wires 15W connect the fingerprint sensor 15F to the memory. As mentioned above, when wires are used, two different connection processes are required for each wired connection, whereas one connection process can be used for each direct, non-wired connection in embodiments of the invention.

FIG. 4 also shows fill material 115G. The fill material 115G (e.g., a thermoset plastic such as polyimide) can be inserted into gap spaces between the components in order to reduce empty spaces and secure the components. For example, there may be excess space to be filled between the electrical contacts 115C, the fingerprint sensor 115F, the memory 115M, one or more walls of the first cavity 115X, and/or one or more walls of the second cavity 115Z. The fill material 115G can be any suitable material, such as injected plastic material. The fill material 115G may be provided into two or more steps as components are placed in the cavities 115X, 115Z.

Embodiments allow the fingerprint sensor 115F and/or electrical contacts 115C to be in different positions on the user device 115, but still adjacent to one another and overlapping the memory 115M so that the benefits described with respect to FIGS. 2-4 still apply. For example, FIGS. 5A-5B show additional examples of possible card configurations, according to embodiments of the invention.

Figure 5A:
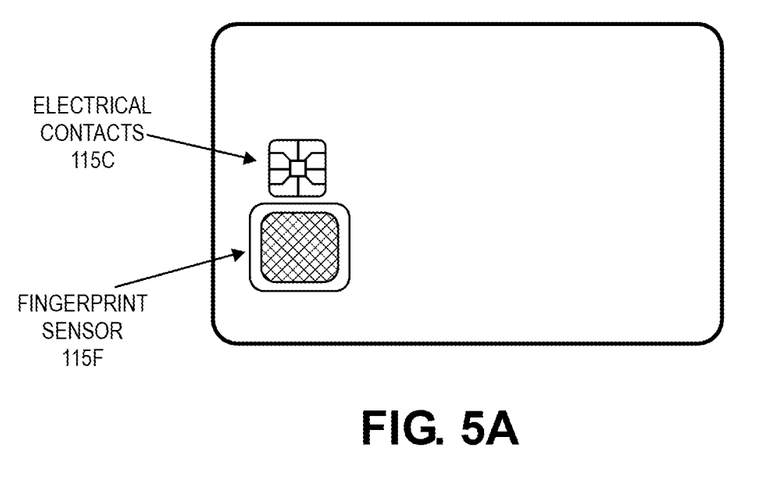
FIGS. 5A-5B show diagrams of a user device with additional possible configurations of components, according to embodiments of the invention.
Figure 5B:
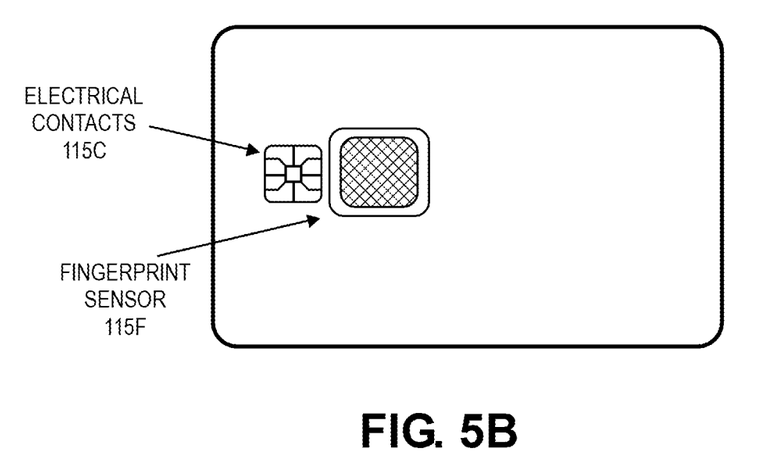

While FIG. 2 shows the fingerprint sensor 115F positioned above of the electrical contacts 115C, FIG. 5A shows the fingerprint sensor 115F positioned below the electrical contacts 115C, and FIG. 5B shows the fingerprint sensor 115F positioned to the right of the electrical contacts 115C. Embodiments allow the fingerprint sensor 115F to be in any other suitable position, such as to the left of the electrical contacts 115C, diagonal of the electrical contacts 115C, or at any suitable angle relative to the electrical contacts 115C. The locations, shapes, and orientations of cavities described above with respect to FIGS. 3 and 4 can also be modified to accommodate the desired positions of the fingerprint sensor 115F and the electrical contacts 115C.

While the illustrated examples show the fingerprint sensor 115F and the electrical contacts 115C both located near the left side of the card, embodiments allow both to be located together in other areas of the card, such as near the right side of the card, near the center of the card, near the top of the card, near the bottom of the card, and/or at any intermediary zones of the card. The fingerprint sensor 115F may be near a card edge, but preferably spaced at least 5 millimeters from the closest card edge. In landscape orientation, it is preferred to space the fingerprint sensor 115F at least 5 millimeters from the top edge of the card (e.g., when the fingerprint sensor 115F is located near the top of the card), at least 5 millimeters from the bottom edge of the card (e.g., when the fingerprint sensor 115F is located near the bottom of the card), and at least 5 millimeters from the right edge of the card (e.g., when the fingerprint sensor 115F is located near the right side of the card), and at least 8.5 millimeters from the left edge of the card (e.g., when the fingerprint sensor 115F is located near the left side of the card).

In some embodiments, certain positions may be preferred, although embodiments are not limited thereto. For example, if the fingerprint sensor 115F is located to the left of the electrical contacts 115C (e.g., between the electrical contacts 115C and the nearest horizontal card-edge), the fingerprint sensor 115F may interfere with contact communications where the electrical contacts 115C comes into contact with a contact reader. Similarly, if the fingerprint sensor 115F is located to above the electrical contacts 115C (e.g., as shown in FIGS. 2 and 3), the fingerprint sensor 115F may interfere with a magnetic stripe which is typically located in or near that same area (e.g., on the backside of the card). Accordingly, it may be preferable to have the fingerprint sensor 115F located in other areas, such as below the electrical contacts 115C (e.g., as shown in FIG. 5A) or to the right of the electrical contacts 115C (e.g., as shown in FIG. 5B).

Figure 6:
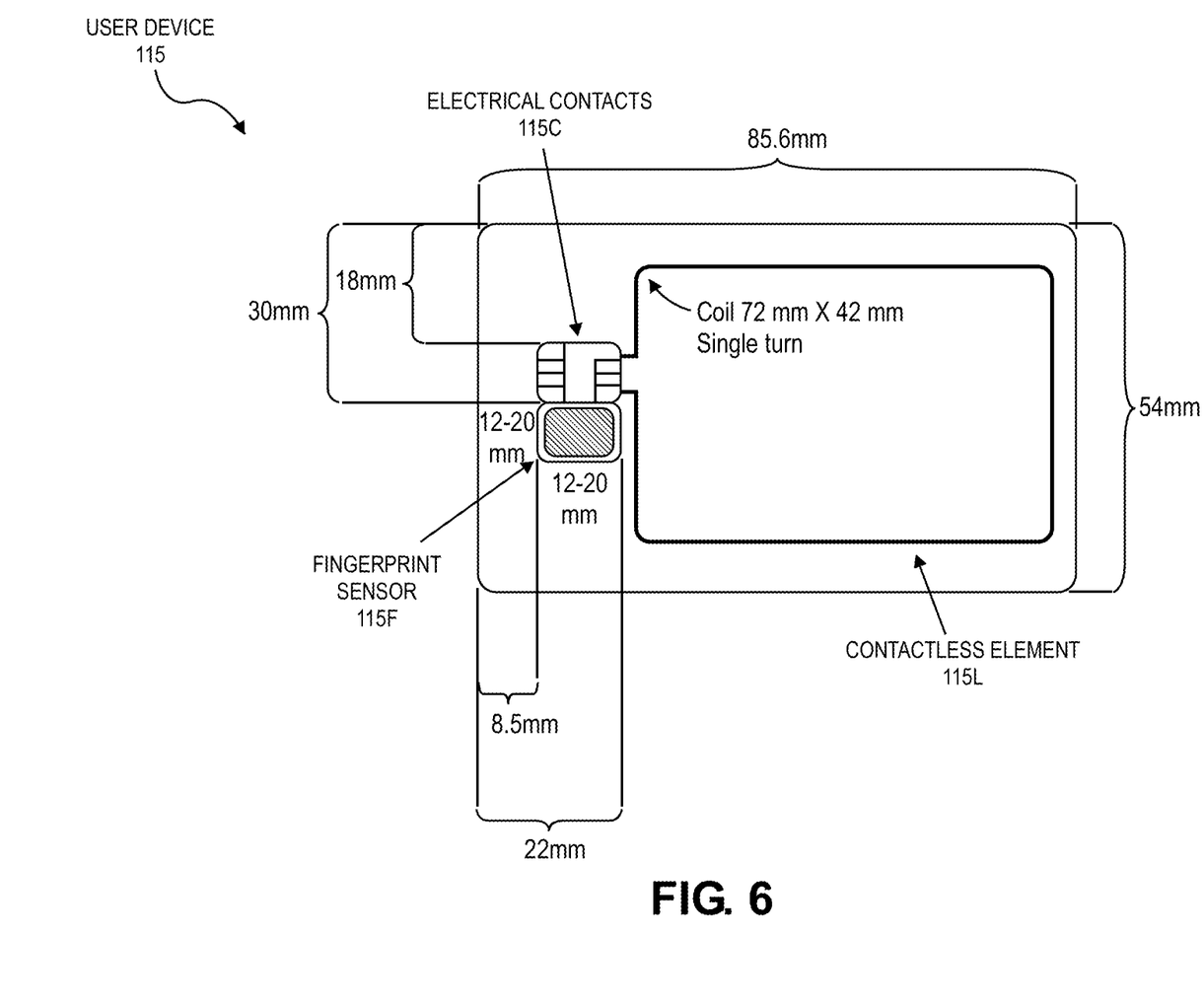
FIG. 6 shows a diagram with dimensions of an example user device, according to embodiments of the invention.

FIG. 6 shows an example of dimensions of a user device 115 and several components of the user device 115, according to embodiments of the invention. The dimensions can vary in any suitable manner. As shown, the user device 115 may have a horizontal width of 85.6 millimeters and a vertical height of 54 millimeters. The electrical contacts 115C may have a width in the range of 12 to millimeters and a height in the range of 12 to 20 millimeters. Similarly, the fingerprint sensor 115F may have a width in the range of 12 to 20 millimeters and a height in the range of 12 to 20 millimeters. The left edges of the electrical contacts 115C and fingerprint sensor 115F may be spaced from the left edge of the card by a distance of 8.5 millimeters, and the right edges of the electrical contacts 115C and fingerprint sensor 115F may be spaced from the left edge of the card that same distance plus the width of the components (e.g., which may total 22 millimeters, as shown in the figure).

The electrical contacts 115C may be spaced from the top edge of the card by a distance of 18 millimeters, and the fingerprint sensor 115F may be spaced from the top edge of the card by a distance of 30 millimeters. In this case, if the electrical contacts 115C have a height of 12 millimeters, then the fingerprint sensor 115F would be directly adjacent to, or even contacting, the electrical contacts 115C (e.g., because 18 millimeters+12 millimeters=30 millimeters). Embodiments allow the electrical contacts 115C and fingerprint sensor 115F to be very close. Even if not directly in contact, the distance between the electrical contacts 115C and the fingerprint sensor 115F may be negligible (e.g., 1 millimeter or less than 1 millimeter) compared to the other distances and dimensions of the card shown in FIG. 6.

The contactless element 115L may be an antenna in the form of a single-turn coil, in some embodiments. In the example shown in FIG. 6, the coil is rectangular with a width of 72 millimeters and a height of 42 millimeters. Embodiments allow the coil dimensions to vary in any suitable manner. For example, the coil can be larger if allowed by the size of the user device 115, or smaller if required by the size of the user device 115. While the contactless element 115L is shown to the right of the electrical contacts 115C and fingerprint sensor 115F in FIG. 6, the contactless element 115L may alternatively extend further to the left of the user device 115 and encircle the electrical contacts 115C and fingerprint sensor 115F. The contactless element 115L may thereby utilize more of the available width of the user device 115 so that a coil with a rectangular width of 72 millimeters can fit on a user device 115 width of 85.6 millimeters.

Figure 7:
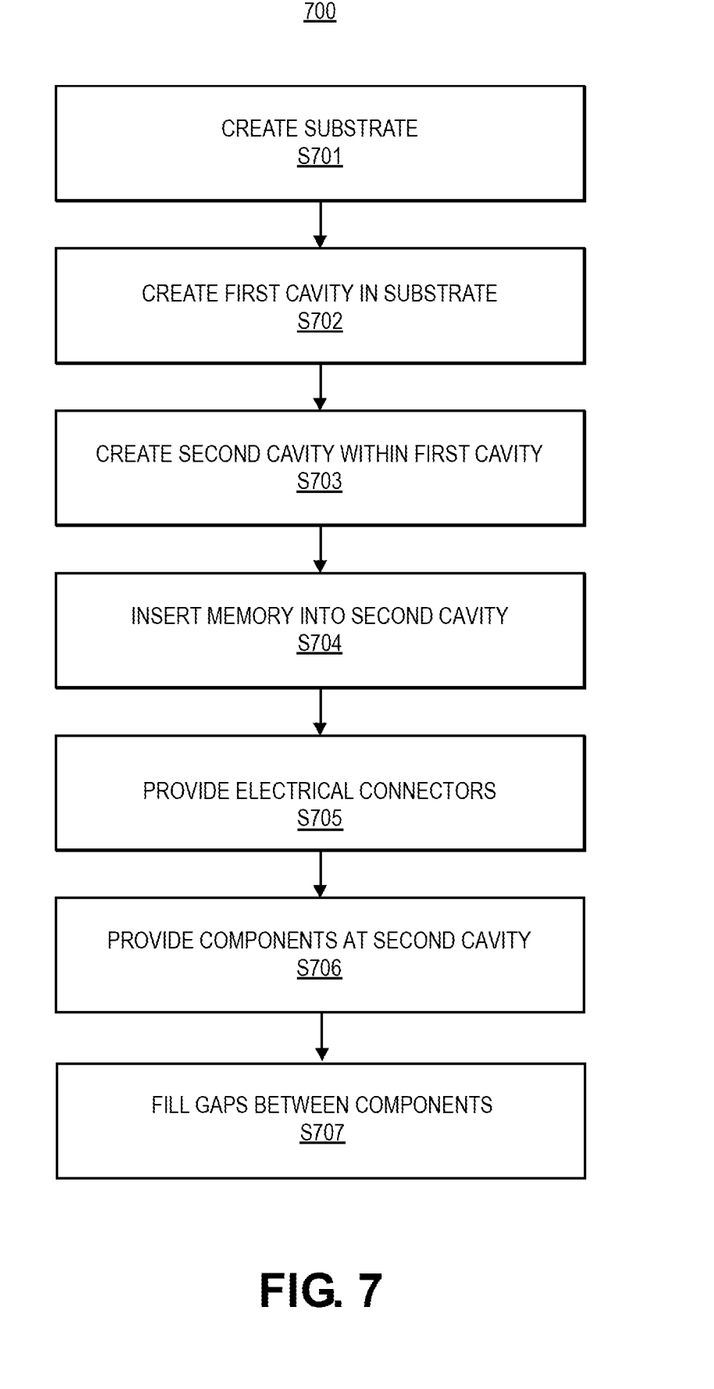
FIG. 7 shows a flow diagram illustrating a method for manufacturing a user device, according to embodiments of the invention.

A method according to embodiments of the invention can be described with respect to FIG. 7.

A user device 115, according to embodiments described above, can be created through a method 700 of manufacturing.

At step S701, a substrate 115S can be created, for example by molding, cutting, shaping, or otherwise manipulating any suitable material (e.g., plastic or metal) into a thin rectangular form. The substrate 115S can include one or more layers, and one or more types of material. Suitable methods may include press molding and injection molding.

At step S702, a first cavity 115X can be created within the substrate 115S. For example, a rectangular (or any other suitable shaped) cavity can be etched (e.g., laser etching or chemical etching with lithography), drilled, or otherwise formed by removing portion of the substrate 115S.

At step S703, a second cavity 115Z can be created within the substrate 115S. The second cavity 115Z can be an additional cavity that is located adjacent to the first cavity 115X. For example, the second cavity 115Z can be positioned underneath the first cavity 115X so that it is deeper than the first cavity 115X. The second cavity 115Z may be created in the same way or a different way than the first cavity 115X. For example, the part forming the opening of the second cavity 115Z can be open, while the remainder of the substrate 115S can be masked. The exposed area of the substrate 115S can etched to the desired depth to form the second cavity 115Z, and the mask can then be removed.

At step S704, one or more components can be inserted into the second cavity 115Z. For example, a memory 115M can be inserted into the second cavity 115Z. A bonding material or adhesive may be on the memory 115M so that it adheres to the bottom surface of the second cavity 115Z.

At step S705, one or more electrical connectors can be provided on the memory. For example, one or more solder balls can be placed at the memory so that other components (e.g., the electrical contacts 115C and the fingerprint sensor 115F) can be electrically connected to the memory when they are placed on top of the memory (e.g., in step S706). Alternatively, solder can a printed on the contacts 115C or the fingerprint sensor 115F and they may be mounted in the first cavity 115X and attached to the memory 115M.

At step S706, one or more components can be provided into the first cavity 115X. For example, pre-existing components such as electrical contacts 115C and a fingerprint sensor 115F can be inserted into the first cavity 115X (e.g., above the first cavity 115X and the memory 115M). In some embodiments, the electrical contacts 115C may not be a separate pre-existing component that is inserted into the first cavity 115X, and instead may be printed onto the first cavity 115X or otherwise fabricated while being applied to the first cavity 115X.

In some embodiments, when the electrical contacts 115C and the fingerprint sensor 115F are placed or otherwise provided at the first cavity 115X, they may contact the solder balls from step S705. As a result, the electrical contacts 115C and the fingerprint sensor 115F can become soldered to the memory 115M when placed into the first cavity 115X in step S706. This results in a first physical and/or electrical connection that is created between the memory 115M and the fingerprint sensor 115F, and a second physical and/or electrical connection that is created between the memory 115M and the electrical contacts 115C. Once connected, the memory 115M can be communicatively and operatively connected to the electrical contacts 115C. The memory 115M can also be communicatively and operatively connected to the fingerprint sensor 115F.

At step S707, gap spaces between the components (e.g., the memory 115M, electrical contacts 115C, the fingerprint sensor 115F, and cavity walls) can be filled using, for example, a plastic filling material. For example, there may be spaces to fill between the memory 115M and the bottom surface forming the second cavity 115Z, between the memory 115M and one or more lateral walls defining the second cavity 115Z, between the contact element 115C and the fingerprint sensor 115F, between the contact element 115C and one or more lateral walls defining the first cavity 115X, and/or between the fingerprint sensor 115F and one or more lateral walls defining the first cavity 115X. A vacuum injection process can be used to inject a filling material into the gaps and the filling material may subsequently be cured. In some embodiments, a protective plastic cover layer exposing the fingerprint sensor 115X, the contacts 115C, and any other functional components. may also be applied to the user device 115 in some cases.

Additionally, at this point or at another suitable (e.g., earlier) time, information can be loaded onto the memory 115M. This can include one or more access applications, credentials, one or more encryption keys, a biometric template (e.g., fingerprint template), and/or any other suitable data.

In some embodiments, the user device 115 can be assembled in alternative manners. For example, the memory 115M may all be electrically connected (e.g., via soldering) to the electrical contacts 115C and the fingerprint sensor 115F when these components are separate from the substrate 115S. In such embodiments, a single combined package can be created that includes the memory 115M, the electrical contacts 115C, and the fingerprint sensor 115F. The combined package can then be inserted all together into the cavities of the substrate 115S at the same time.

Figure 8:
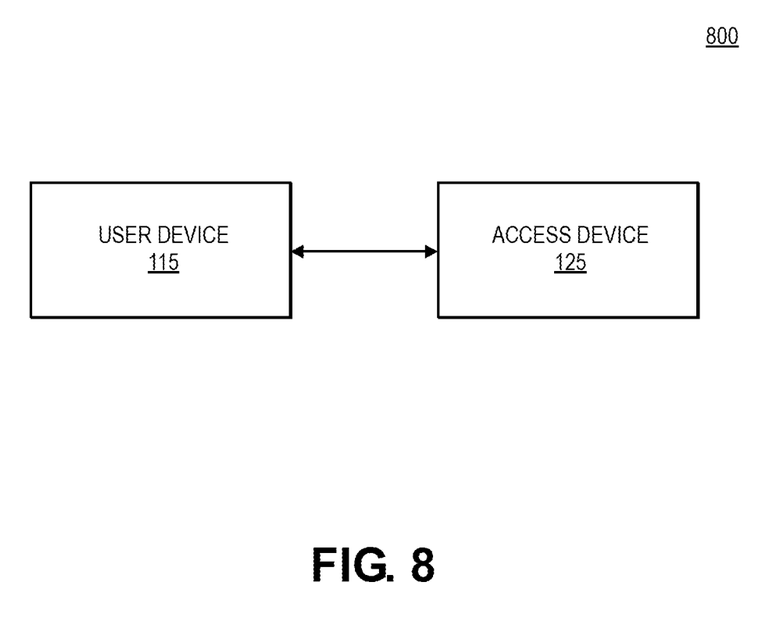
FIG. 8 shows an example of a system, according to embodiments of the invention.

FIG. 8 shows an example of a system, according to embodiments of the invention. The system 800 includes a user device 115 in communication with an access device 125. The user device 115 can interact with the access device 125 in order to gain access.

The access device 125 may be any suitable device that provides access and/or determines whether access is to be granted. As examples, the access device 125 can provide access to physical space, information, a remote system, etc. The access device 125 may be in any suitable form. Some examples of access devices include kiosks, security systems, access systems, cellular phones, PDAs, personal computers (PCs), tablet PCs, hand-held specialized readers, set-top boxes, POS or point of sale devices (e.g., POS terminals), electronic cash registers (ECRs), automated teller machines (ATMs), virtual cash registers (VCRs), and the like. An access device may use any suitable contact or contactless mode of operation to send or receive data from, or associated with, the user device 115. The access device 125 may include a reader, a processor, a computer-readable medium, input elements (e.g., buttons), and/or a network interface. A reader may include any suitable contact or contactless mode of operation. For example, exemplary card readers can include contactless readers (e.g., radio frequency (RF) antennas), contact chip readers, optical scanners, bar code readers, or magnetic stripe readers to interact with the user device 115.

Embodiments of the invention have a number of advantages. For example, in embodiments of the invention, a user device is provided that can be manufactured and produced on a large-scale more efficiently and less costly in comparison with prior user devices. By placing certain components in the same area of the user device instead of in separate areas of the user device, wires can be reduced and/or removed, soldering points can be reduced, multiple integrated circuits can be combined into one, and manufacturing steps reduced and/or simplified. The elimination of wires can reduce undesirable electromagnetic effects, such as resistance and inductive capacitance, and thereby improve power efficiency and signal integrity. Additionally, the more compact and simple configuration can create a user device that is less error-prone and more resistant to damage.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A user device comprising:
   a substrate;
   a first cavity in the substrate;
   a second cavity in the substrate, the second cavity being adjacent to the first cavity in the substrate;
   a memory within the second cavity;
   electrical contacts within the first cavity, the electrical contacts at least partially overlapping the memory;
   a fingerprint sensor within the first cavity and laterally adjacent to the electrical contacts, the fingerprint sensor at least partially overlapping the memory;
   a first electrical connection between the memory and the electrical contacts, the first electrical connection enabling communication between the memory and the electrical contacts; and
   a second electrical connection between the memory and the fingerprint sensor, the second electrical connection enabling communication between the memory and the fingerprint sensor.

2. The user device of claim 1, wherein the first cavity is larger than the second cavity.

3. The user device of claim 1, wherein the first and second electrical connections comprise soldered connections.

4. The user device of claim 3, wherein the second electrical connection includes a solder ball that contacts both the memory and the fingerprint sensor, and wherein the second electrical connection does not include a wire external to the memory and the fingerprint sensor.

5. The user device of claim 1, wherein the substrate is a plastic card.

6. The user device of claim 1, wherein the memory includes a secure element.

7. The user device of claim 1, wherein walls defining the second cavity are cooperatively structured with the memory.

8. The user device of claim 1, wherein walls defining the first cavity are cooperatively structured with the electrical contacts and the fingerprint sensor when the electrical contacts and the fingerprint sensor are within the same plane, and wherein the electrical contacts are spaced less than 5 millimeters from the fingerprint sensor.

9. The user device of claim 1, wherein the memory is directly connected to the electrical contacts and the fingerprint sensor.

10. The user device of claim 1, further comprising:
    plastic material filling gap spaces between the memory, the electrical contacts, the fingerprint sensor, and the substrate.

11. A method of manufacturing a user device, the method comprising:
    creating a substrate;
    creating a first cavity within the substrate;
    creating a second cavity within the substrate, the second cavity being adjacent to the first cavity;
    inserting a memory into the second cavity;
    inserting a fingerprint sensor into the first cavity, the fingerprint sensor at least partially overlapping the memory, where the fingerprint sensor is electrically coupled to at least one first electrical connector connecting the fingerprint sensor to the memory; and
    providing electrical contacts in the first cavity, the electrical contacts at least partially overlapping the memory and laterally adjacent to the fingerprint sensor, where one or more of the electrical contacts are electrically coupled to at least one second electrical connector connecting the electrical contacts to the memory.

12. The method of claim 11, further comprising:
    filling gap spaces between the memory, the electrical contacts, the fingerprint sensor, and the substrate.

13. The method of claim 12, wherein filling the gap spaces includes inserting plastic material into the gap spaces.

14. The method of claim 11, further comprising:
    loading a credential onto the memory.

15. The method of claim 11, further comprising:
    loading a fingerprint template onto the memory.

16. The method of claim 11, wherein the first electrical connector and the second electrical connector comprise solder.

17. The method of claim 11, wherein the user device is a payment card.

18. A user device comprising:
- a substrate;
- a first cavity in the substrate;
- a second cavity in the substrate, the second cavity being adjacent to the first cavity in the substrate;
- a memory within the second cavity;
- electrical contacts within the first cavity and configured for communications with an external device, the electrical contacts at least partially overlapping the memory;
- a fingerprint sensor within the first cavity, the fingerprint sensor at least partially overlapping the memory;
- a first electrical connection between the memory and the electrical contacts, the first electrical connection enabling communication between the memory and the electrical contacts; and
- a second electrical connection between the memory and the fingerprint sensor, the second electrical connection enabling communication between the memory and the fingerprint sensor.

19. The user device of claim 18, wherein the electrical contacts include electrically conductive lands, pads, or plates, and the electrical contacts are spaced less than 5 millimeters from the fingerprint sensor.

20. The user device of claim 18, wherein the substrate is a card comprising plastic or metal, and walls defining the second cavity are cooperatively structured with the memory.

* * * * *